US012086182B2

(12) United States Patent
Lu et al.

(10) Patent No.: US 12,086,182 B2
(45) Date of Patent: Sep. 10, 2024

(54) METHOD AND SYSTEM OF BUILDING KNOWLEDGE GRAPH AND METHOD AND SYSTEM OF CONVERSING NEWS EVENT

(71) Applicant: NATIONAL CHENG KUNG UNIVERSITY, Tainan (TW)

(72) Inventors: Wen-Hsiang Lu, Tainan (TW); Cheng-Wei Lin, Tainan (TW); Bo Yang Huang, Taichung (TW); Chia-Ming Tung, Kaohsiung (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 168 days.

(21) Appl. No.: 17/836,647

(22) Filed: Jun. 9, 2022

(65) Prior Publication Data

US 2023/0409637 A1 Dec. 21, 2023

(30) Foreign Application Priority Data

May 25, 2022 (TW) .................................. 111119394

(51) Int. Cl.
| | |
|---|---|
| *G06F 16/901* | (2019.01) |
| *G06F 16/9032* | (2019.01) |
| *G06F 16/9038* | (2019.01) |
| *G06F 16/906* | (2019.01) |
| *G06F 16/93* | (2019.01) |

(52) U.S. Cl.
CPC .... *G06F 16/9024* (2019.01); *G06F 16/90332* (2019.01); *G06F 16/9038* (2019.01); *G06F 16/906* (2019.01); *G06F 16/93* (2019.01)

(58) Field of Classification Search
CPC .......... G06F 16/9024; G06F 16/90332; G06F 16/9038; G06F 16/906; G06F 16/93; G06F 16/90
See application file for complete search history.

(56) References Cited

U.S. PATENT DOCUMENTS

| | | | | |
|---|---|---|---|---|
| 11,177,937 | B1* | 11/2021 | McCown | H04L 9/50 |
| 2014/0337306 | A1* | 11/2014 | Gramatica | G06F 16/9535 |
| | | | | 707/706 |
| 2016/0117604 | A1* | 4/2016 | Frosst | G06N 5/02 |
| | | | | 706/12 |
| 2020/0242349 | A1* | 7/2020 | Ferreira Moreno | ......... |
| | | | | G06V 30/18171 |
| 2020/0257850 | A1* | 8/2020 | Carbune | G06F 40/30 |

FOREIGN PATENT DOCUMENTS

CN 111931027 A 11/2020

\* cited by examiner

*Primary Examiner* — Taelor Kim
(74) *Attorney, Agent, or Firm* — Maschoff Brennan

(57) ABSTRACT

A method of building a knowledge graph, performed by a processing device, includes: classifying news articles to a main event associated with sub events, using the main event as a first node of the knowledge graph, using the sub events as second nodes of the knowledge graph respectively, connecting the second nodes to the first node, extracting event summaries from the news articles respectively according to a template, using the event summaries as third nodes of the knowledge graph respectively, and connecting each of the third nodes to one of the second nodes according to association between the event summaries and the sub events, extracting commenter identities from the event summaries, and using the commenter identities as fourth nodes of the knowledge graph, and connecting each of the fourth nodes to one of the third nodes.

18 Claims, 9 Drawing Sheets

METHOD AND SYSTEM OF BUILDING KNOWLEDGE GRAPH AND METHOD AND SYSTEM OF CONVERSING NEWS EVENT

CROSS-REFERENCE TO RELATED APPLICATIONS

This non-provisional application claims priority under 35 U.S.C. § 119(a) on Patent Application No(s). 111119394 filed in Republic of China (ROC) on May 25, 2022, the entire contents of which are hereby incorporated by reference.

BACKGROUND

1. Technical Field

This disclosure relates to a method and system of building knowledge graph and method and system of conversing news event, especially to a method and system of building knowledge graph and method and system of conversing news event applicable to a chatbot.

2. Related Art

In the era of information explosion, in addition to traditional newspapers and magazines, there are news from different media on the Internet, and the same topic may contain different information depending on the interviewee. However, although readers can receive various information, not every interviewee has a professional and detailed understanding of the subject they interviewed. Therefore, the reader may receive incomplete or even wrong information.

SUMMARY

Accordingly, this disclosure provides a method and system of building knowledge graph and method and system of conversing news event.

According to one or more embodiment of this disclosure, a method of building a knowledge graph, performed by a processing device, includes: classifying a number of news articles to a main event, with the main event associated with a number of sub events; using the main event as a first node of the knowledge graph; using the sub events as a number of second nodes of the knowledge graph respectively; connecting the second nodes to the first node; extracting a number of event summaries from the news articles respectively according to a template; using the event summaries as a number of third nodes of the knowledge graph respectively, and connecting each of the third nodes to one of the second nodes according to association between the event summaries and the sub events; extracting a number of commenter identities from the event summaries; and using the commenter identities as a number of fourth nodes of the knowledge graph, and connecting each of the fourth nodes to one of the third nodes.

According to one or more embodiment of this disclosure, a method of conversing a news event, performed by a processing device, includes: parsing a user question to obtain a target question; determining a target event knowledge graph matching the target question from a number of news event knowledge graphs generated from the method of building knowledge graph described above; determining a target sub event matching the target question from the sub events of the target event knowledge graph; using the event summary connecting the target sub event as a target summary; and outputting a complete answer according to the target summary and one or more commenter identities corresponding to the target summary from the commenter identities.

According to one or more embodiment of this disclosure, a system of building a knowledge graph includes: a memory and a processing device connected to the memory. The memory is configured to store a main event and a number of sub events, with the main event being associated with a number of sub events. The processing device is configured to perform: classifying a number of news articles to the main event; using the main event as a first node of the knowledge graph; using the sub events as a number of second nodes of the knowledge graph respectively; connecting the second nodes to the first node; extracting a number of event summaries from the news articles respectively according to a template; using the event summaries as a number of third nodes of the knowledge graph respectively, and connecting each of the third nodes to one of the second nodes according to association between the event summaries and the sub events; extracting a number of commenter identities from the event summaries; and using the commenter identities as a number of fourth nodes of the knowledge graph, and connecting each of the fourth nodes to one of the third nodes.

According to one or more embodiment of this disclosure, a system of conversing a news event includes: a user interface, a memory and a processing device connected to the user interface and the memory. The user interface is configured to receive a user question. The memory stores a number of news event knowledge graphs generated from the method of building knowledge graph described above. The processing device is configured to perform: parsing the user question to obtain a target question; determining a target event knowledge graph matching the target question from the news event knowledge graphs; determining a target sub event matching the target question from the sub events of the target event knowledge graph; using the event summary connecting the target sub event as a target summary; and outputting a complete answer according to the target summary and one or more commenter identities corresponding to the target summary from the commenter identities.

In view of the above, method and system of building knowledge graph according to one or more embodiment of the present disclosure may provide structural and detailed information, and the system (for example, search engine and the system of conversing news event of the present disclosure) using the knowledge graph may acquire related information according to the knowledge graph in a faster way. According to one or more embodiment of the method and system of conversing news event of the present disclosure, when a user raises a question through the user interface, the processing device may determine which the field of expertise the question belongs to may be determined and the event summary for answering the user question may be provided. Therefore, the user may obtain brief and relevant information without spending much time on searching.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
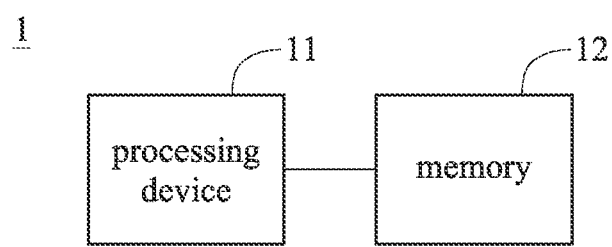
FIG. 1 is a block diagram illustrating a system of building knowledge graph according to an embodiment of the present disclosure.
Figure 2:
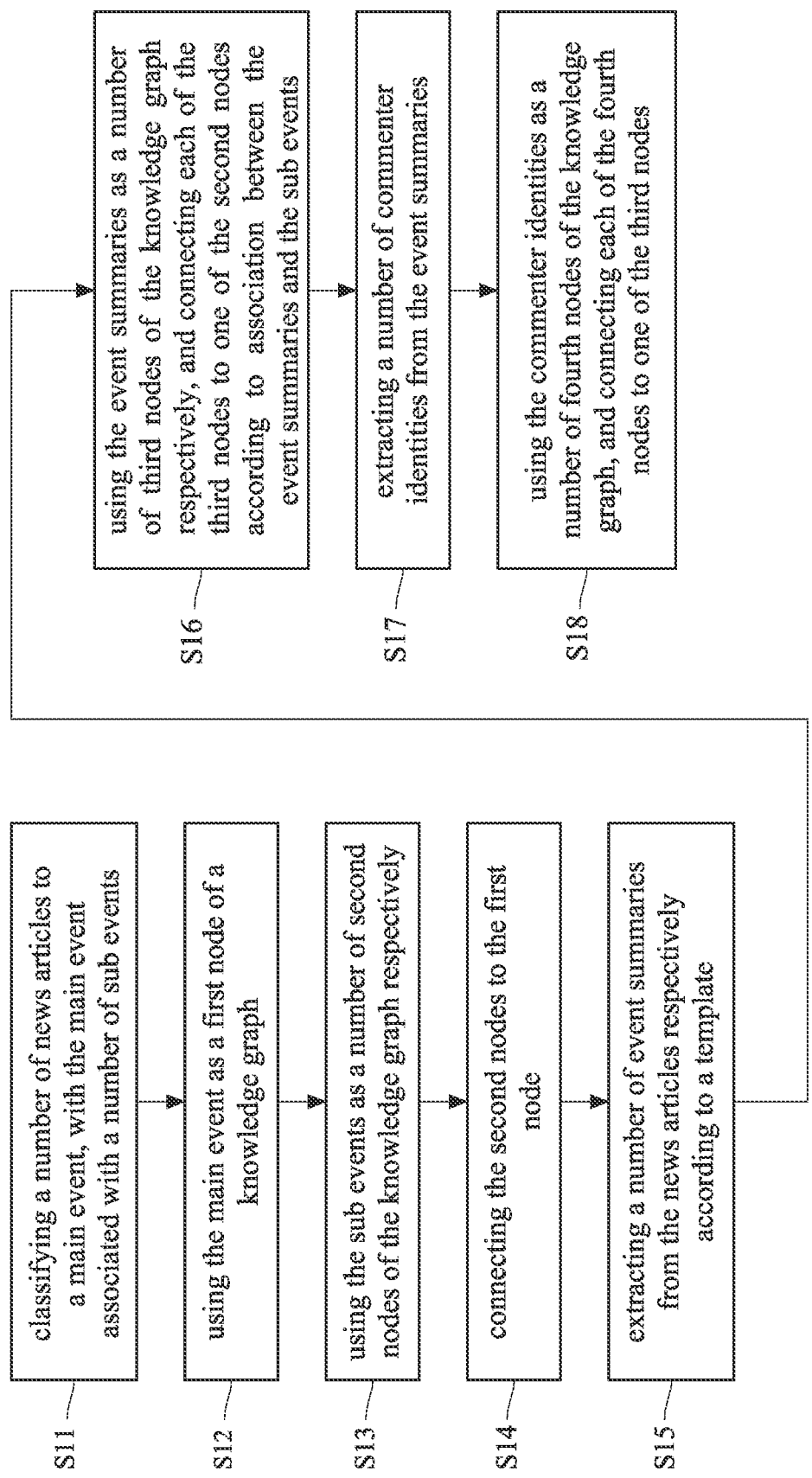
FIG. 2 is a flowchart illustrating a method of building knowledge graph according to an embodiment of the present disclosure.

Please refer to FIG. 1 and FIG. 2, wherein FIG. 1 is a block diagram illustrating a system of building knowledge graph according to an embodiment of the present disclosure, and FIG. 2 is a flowchart illustrating a method of building knowledge graph according to an embodiment of the present disclosure. The system of building knowledge graph 1 of an embodiment of the present disclosure may include a processing device 11 and a memory 12, the processing device 11 may be electrically connected to the memory 12 or in communication connection with the memory 12. The processing device 11 may be implemented with a processor, a programmable logic device (PLD) or an application specific integrated circuit (ASIC) etc., the present disclosure is not limited thereto. The memory 12 is preferably a non-volatile memory (NVM), for example, may be a read-only memory (ROM), an electrically-erasable programmable read-only memory (EEPROM) or a flash memory etc., the present disclosure is not limited thereto.

The method of building knowledge graph of an embodiment of the present disclosure may be performed by the system of building knowledge graph 1, especially performed by the processing device 11 of the system of building knowledge graph 1. As shown in FIG. 2, the method of building knowledge graph may include, performed by the processing device 11, the following steps: step S11: classifying a number of news articles to a main event, with the main event associated with a number of sub events; step S12: using the main event as a first node of a knowledge graph; step S13: using the sub events as a number of second nodes of the knowledge graph respectively; step S14: connecting the second nodes to the first node; step S15: extracting a number of event summaries from the news articles respectively according to a template; step S16: using the event summaries as a number of third nodes of the knowledge graph respectively, and connecting each of the third nodes to one of the second nodes according to association between the event summaries and the sub events; step S17: extracting a number of commenter identities from the event summaries; and step S18: using the commenter identities as a number of fourth nodes of the knowledge graph, and connecting each of the fourth nodes to one of the third nodes. In this embodiment, step S12 and step S13 may be performed simultaneously, step S12 may be performed after step S13, and step S12 to step S14 may be performed before step S11, the present disclosure is not limited thereto.

Figure 3:
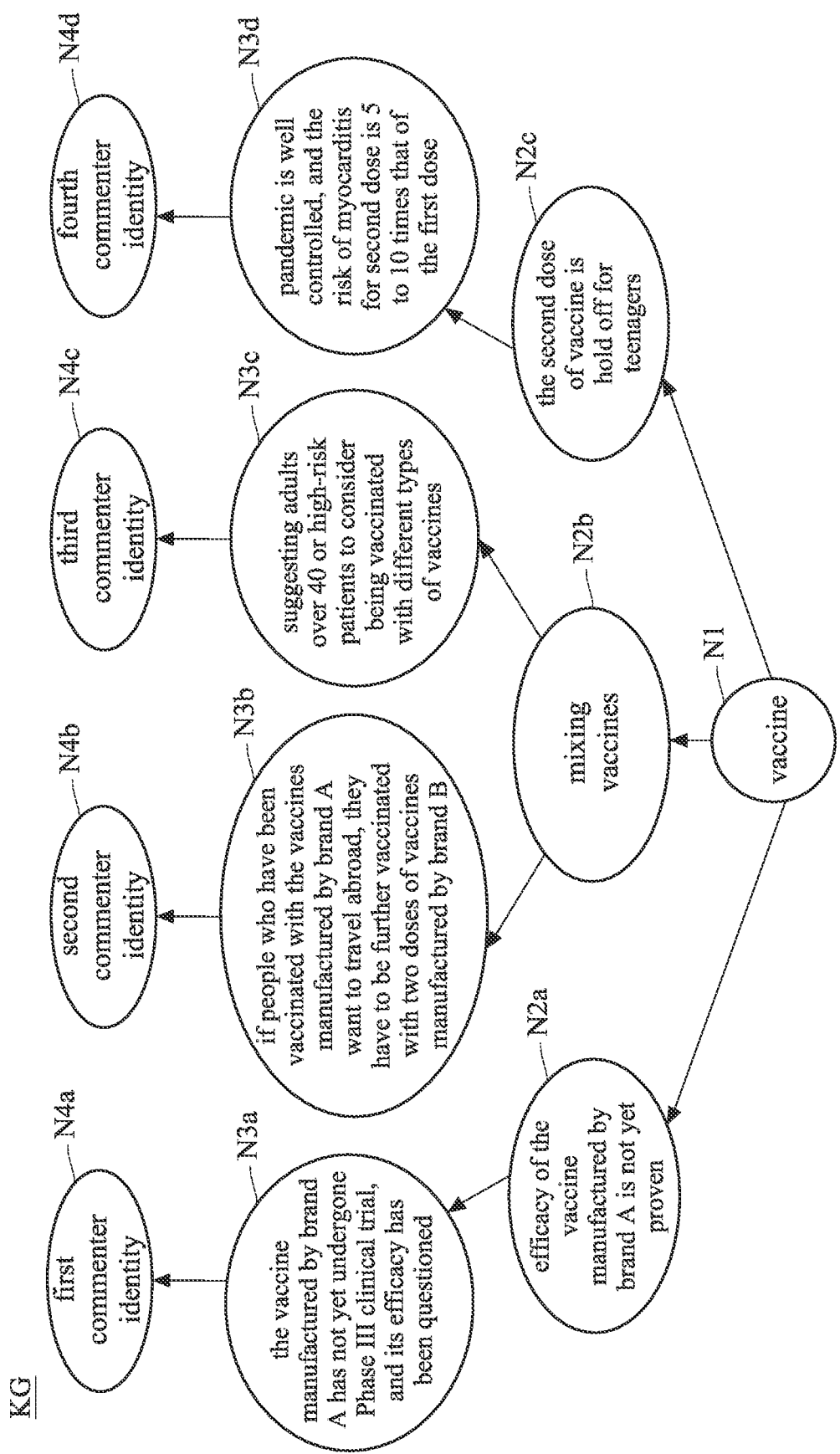
FIG. 3 is an exemplary diagram illustrating a knowledge graph according to an embodiment of the present disclosure.

To explain the above description in more detail, please refer to FIG. 1 to FIG. 3, wherein FIG. 3 is an exemplary diagram illustrating a knowledge graph according to an embodiment of the present disclosure, and the knowledge graph KG shown in FIG. 3 is illustrated based on news related to Coronavirus Disease 2019 (COVID-19). It should be noted that, the memory 12 may pre-store the main event and the sub events described in step S11, and the main event is associated with the sub events. Specifically, the processing device 11 or another processing device connected to the memory 12 may build the association between the main event and the sub events in advance, and method of building the association between the main event and the sub events may include extracting a number of sub events from a number of news titles of a number of news containing the main event as well as from first paragraphs of the news containing the main event, wherein the format of the sub event may be a pair of "subject-verb" or a pair of "verb-object", and a number of words between the subject and the verb is preferably no more than 10 words, the present disclosure does not limit the specific number of the words between the subject and the verb. For example, assuming a news title of a news is "Parents don't worry! Seven hundred thousand doses of pediatric vaccines just arrived, inoculation starts next week at the earliest", and the first paragraph of the same news includes "A contract was signed with a vaccine company to purchase 4 million doses of adult and pediatric doses of the new coronavirus disease vaccine. Following the arrival of the first batch of 1.857 million doses of adult vaccines, the first batch of 777,600 doses of pediatric vaccines also arrived this morning". Then, the sub events extracted from the news title may include "vaccine arrived (subject-verb)" and "inoculation starts (subject-verb)", and the sub events extracted from the first paragraph may include "contract is signed with a vaccine company (subject-verb)", "purchase vaccine (verb-object)" and "vaccine arrived (subject-verb)". In addition, since a number of sub events may be extracted from the news, before storing the sub events into the memory 12, the processing device 11 may sort the sub events according to the frequencies of each sub event mentioned in the news, and delete sub events with frequencies mentioned in the news lower than a frequency threshold. The frequency of a sub event mentioned in the news may be obtained by, for example, dividing a number of times of the sub event mentioned in the news by the article number of the news, and the frequency threshold may be, for example, 0.5, the present disclosure does not limit the actual value of the frequency threshold.

In step S11, the processing device 11 may obtain a number of news articles associated with the main event from the Internet or cloud through web crawler. If the main event is "vaccine", the sub event may be a topic associated with vaccine, such as "the efficacy of the vaccine manufactured by brand A is not yet proven", "mixing vaccines" and "the second dose of vaccine is hold off for teenagers" etc. The processing device 11 may obtain a number of news articles associated with vaccine (the main event) and vaccine topic (the sub event) through web crawler. Specifically, the news articles obtained by the processing device 11 may be: articles with title containing words of the main event and/or the sub event, articles with a number of times of the main event and/or the sub event mentioned in the contents of the articles reaching a predetermined number etc. After determining news articles associated with vaccine, the processing device 11 may classify the news articles to the main event "vaccine". In steps S12, S13 and S14, the processing device 11 uses the main event "vaccine" as a first node N1 of the knowledge graph KG, uses a number of sub events listed above as a number of the second nodes N2a, N2b and N2c of the knowledge graph KG, and connects the second nodes N2a to N2c to the first node N1. It should be noted that, "using the main event as the first node of the knowledge graph" described herein means storing the main event as the first node of the knowledge graph, the same also applies for the second nodes, third nodes and fourth nodes described below. In addition, the processing device 11 may also first obtain a number of news articles with titles contain the main event, then obtain one or more sub events from the title and first paragraph of each news article by building the association between the main event and the sub event as described above. Further, after screening the sub events by the frequency of being mentioned in the news article as described above, if the remained sub events match the existing sub events, the processing device 11 may perform the following steps on this news article; if the remained sub events match none of the existing sub events, the processing device 11 may build a new sub event on the knowledge graph according to the remained sub events.

Then, in step S15, the processing device 11 extracts a number of event summaries from the news articles classified to the main event according to a template, wherein the template may be "name—said/stated/pointed out—comment", and the comment extracted according to the template may be used as the event summary. For example, if one of the news articles classified to the main event recite ". . . Doctor Luan-Yin Chang pointed out that, adults over the age of 40, the elderly or high-risk patients can consider mixed vaccines, and the efficacy will be much higher than two doses of AZ", then the processing device 11 may extract the name "Luan-Yin Chang" according to the template and the comment "adults over the age of 40, the elderly or the high-risk patients can consider mixed vaccines, and the efficacy will be much higher than two doses of AZ" as the event summary. In other words, the event summary at this stage contains the commenter identity and his/hers comments in the news article.

In step S16, take FIG. 3 as an example, the processing device 11 may use the event summaries as a number of third nodes N3a, N3b, N3c and N3d of the knowledge graph KG respectively, and connect the third nodes N3a~N3d of the event summaries with one of the associated second nodes N2a~N2c of the sub events, wherein said "associated" means, for example, the event summary contains the exact words of the sub event, or contains a part of the words of the sub event and the percentage of said part of the words in all the words of the sub event reaches a predetermined percentage (for example, 50%), but the present disclosure is not limited thereto. Further, take the third node N3c as an example, the event summary of the third node N3c contains a part of the words (i.e. mixing vaccines) of the sub event of the second node N2b and reaches the predetermined percentage, the processing device 11 determines the event summary of the third node N3c is associated with the sub event of the second node N2b, and connects the third node N3c to the second node N2b.

In steps S17 and S18, the processing device 11 extracts a commenter identity from the corresponding news article according to the event summary, uses the commenter identity as the fourth node, and connects the fourth node to the corresponding third node. As described above, the event summary extracted in step S15 contains the commenter identity and the comment he/she made in the news article, and in steps S17 and S18, the processing device 11 further extracts the commenter identity from the event summary as the fourth node. Take FIG. 3 as an example, the event summaries after the extraction of the commenter identities are the event summaries represented by the third nodes N3a~N3d as shown in FIG. 3, and the processing device 11 may use the commenter identities (for example, commenter names) as the fourth nodes N4a, N4b, N4c and N4d of the knowledge graph KG, and connect each of the fourth nodes N4a~N4d to the corresponding one of third nodes N3a~N3d. Take the news article mentioned above as an example, the commenter identity corresponding to the event summary of the third node N3c is "Luan-Yin Chang", the processing device 11 may use the commenter identity "Luan-Yin Chang" as the fourth node N4c, and connect the fourth node N4c to the third node N3c. Accordingly, the knowledge graph built with the above embodiment may provide structural and detailed information, and the system (for example, search engine) using the knowledge graph may acquire related information according to the knowledge graph in a faster way.

In addition, after building the knowledge graph KG, the processing device 11 may dynamically delete one or more of the second nodes N2a~N2c from the knowledge graph KG. Specifically, the processing device 11 may determine the number of news articles related to the main event of the first node published within a period of time (for example, one week, one month, three months etc.) through web crawler, as well as the number of news articles where each sub event of the second node is mentioned in said news articles related to the main event, and divide the number of news articles corresponding to the second nodes by the number of news articles corresponding to the first node to obtain a ratio. If the ratio is smaller than a predetermined ratio, the processing device 11 may delete the second node as well as the third node and the fourth node connected to the second node, wherein the predetermined ratio may be 0.2, but the present disclosure does not limit the actual value of the predetermined ratio.

Figure 4:
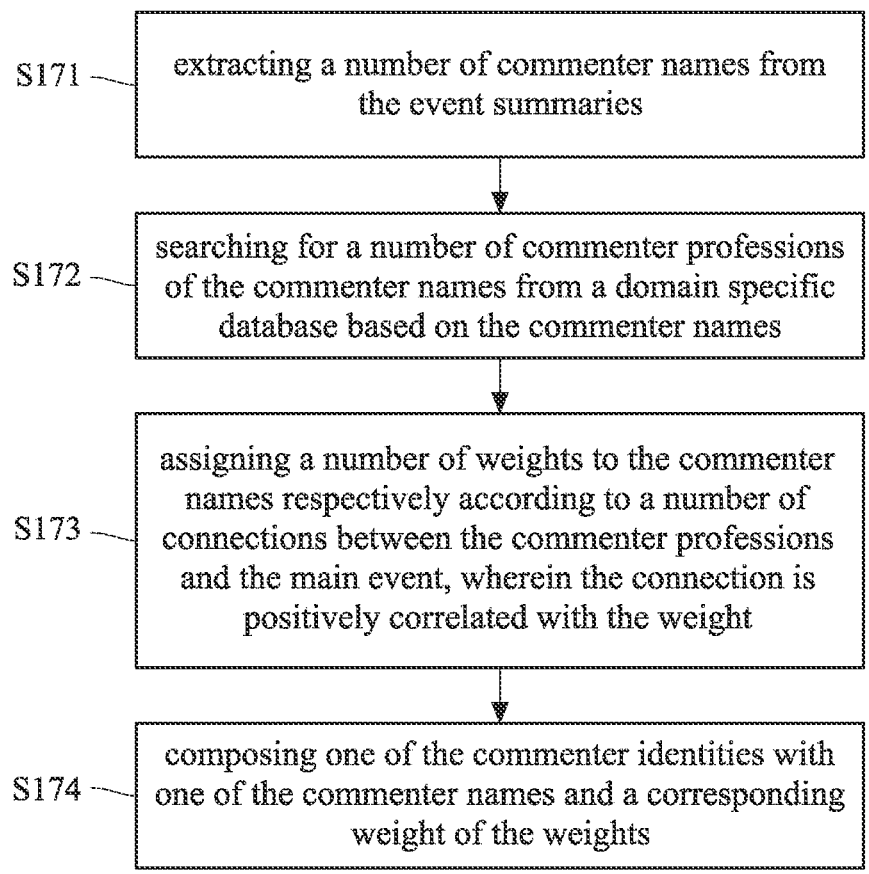
FIG. 4 is a detailed flowchart illustrating step S17 of FIG. 2.

To further illustrate the description of extracting the commenter identities, please refer to FIG. 1 and FIG. 4, wherein FIG. 4 is a detailed flowchart illustrating step S17 of FIG. 2. As shown in FIG. 4, step S17 in FIG. 2 may include: step S171: extracting a number of commenter names from the event summaries; step S172: searching for a number of commenter professions of the commenter names from a domain specific database based on the commenter names; step S173: assigning a number of weights to the commenter names respectively according to a number of connections between the commenter professions and the main event, wherein the connections and the weights have a positive correlation therebetween; and step S174: composing one of the commenter identities with one of the commenter names and a corresponding weight of the weights.

In step S171 and S172, the processing device 11 extracts the commenter name from the event summary, and search a profession corresponding to the commenter name from the domain specific database to use searched profession as the commenter profession, wherein the domain specific database stores a number of names and a number of professions respectively corresponding to the names. The domain specific database may be a database in the memory 12, the domain specific database may also be an external database, such as Wikipedia etc. Take the above-mentioned news article as an example, the commenter name extracted by the processing device 11 is "Luan-Yin Chang", and the profession searched from the domain specific database based on the name "Luan-Yin Chang" includes pediatric infectious disease attending physician, and the processing device 11 may use "pediatric infectious disease attending physician" as the commenter profession corresponding to the name "Luan-Yin Chang".

Then in step S173, the processing device 11 assigns the commenter name with the corresponding weight according to the connection between the commenter profession and the main event, wherein the weight is higher when the connection between the commenter profession and the main event is higher. The processing device 11 may pre-store a dictionary recording professions associated with the main event. The dictionary records professions in the field of the main event. Assuming the main event is "vaccine", the professions associated with the main event that are recorded in the dictionary may include heads of official health units, pediatricians and professors of the Department of Immunology, etc. Therefore, when assigning the corresponding weight to the commenter name, the processing device 11 may follow the following rules to assign the corresponding weight: if the commenter profession matches one of the professions associated with the main event that are recorded in the dictionary, and the commenter profession shown on Wikipedia page matches the profession searched from the dictionary, then assign the commenter with the highest weight; if the commenter profession matches one of the professions associated with the main event that are recorded in the dictionary, but the commenter does not have a Wikipedia page, then assign the commenter with the second highest weight; and if the commenter profession does not match any one of the professions associated with the main event that are recorded in the dictionary, then assign the commenter with the lowest weight. In implementation, multiple commenters may have the same weight, the present disclosure is not limited thereto.

In addition, in a case where a number of the third nodes are connected to the same second node, the processing device 11 may filter out professions of the commenters that are unrelated to the main event according to the dictionary, and assign the commenters that are filtered out with a predetermined lowest weight (for example, the weight is 0). Therefore, the processing device 11 may not need to additionally search for Wikipedia page of the commenter with profession unrelated to the main event to assign a weight. Or, take the commenter profession being "pediatric infectious disease attending physician" as an example, the processing device 11 may determine a number of times that "pediatric infectious disease" or "pediatric infectious disease attending physician" and the main event "vaccine" are commonly shown in articles through web crawler, and divide said number by a preset number to obtain the weight; or, the processing device 11 may search for "pediatric infectious disease" or "pediatric infectious disease attending physician" along with the main event "vaccine" on Google search engine, and divide the number of the search result by a preset number to obtain the weight. On the contrary, if the commenter name extracted by the processing device 11 from the event summary of the third node N3c is "John", and the processing device 11 obtains a search result from a domain specific database indicating that the commenter profession corresponding to the name "John" is "singer", then the weight corresponding to the name "John" may be lower than the weight of "Luan-Yin Chang" corresponding to "pediatric infectious disease attending physician". In short, the weight represents the commenter's expertise in the field of the comment he/she made. Therefore, when the weight is higher, it means that the commenter has a higher level of expertise in the field of his/her comment belongs, and his/her comment is more informative.

Then, in step S174, the processing device 11 matches the commenter name with the corresponding weight to use the matched commenter name and weight as the commenter identity of the fourth node. Take FIG. 3 as an example, the third commenter identity of the fourth node N4c includes the commenter name who published the comment of the event summary of the third node N3c and the corresponding weight, wherein the weight represents the connection between the commenter profession corresponding to the commenter name and the main event of the first node N1. In other words, the third commenter identity of the fourth node N4c includes the commenter name "Luan-Yin Chang" and the weight representing the connection between the commenter name and the main event.

Figure 5:
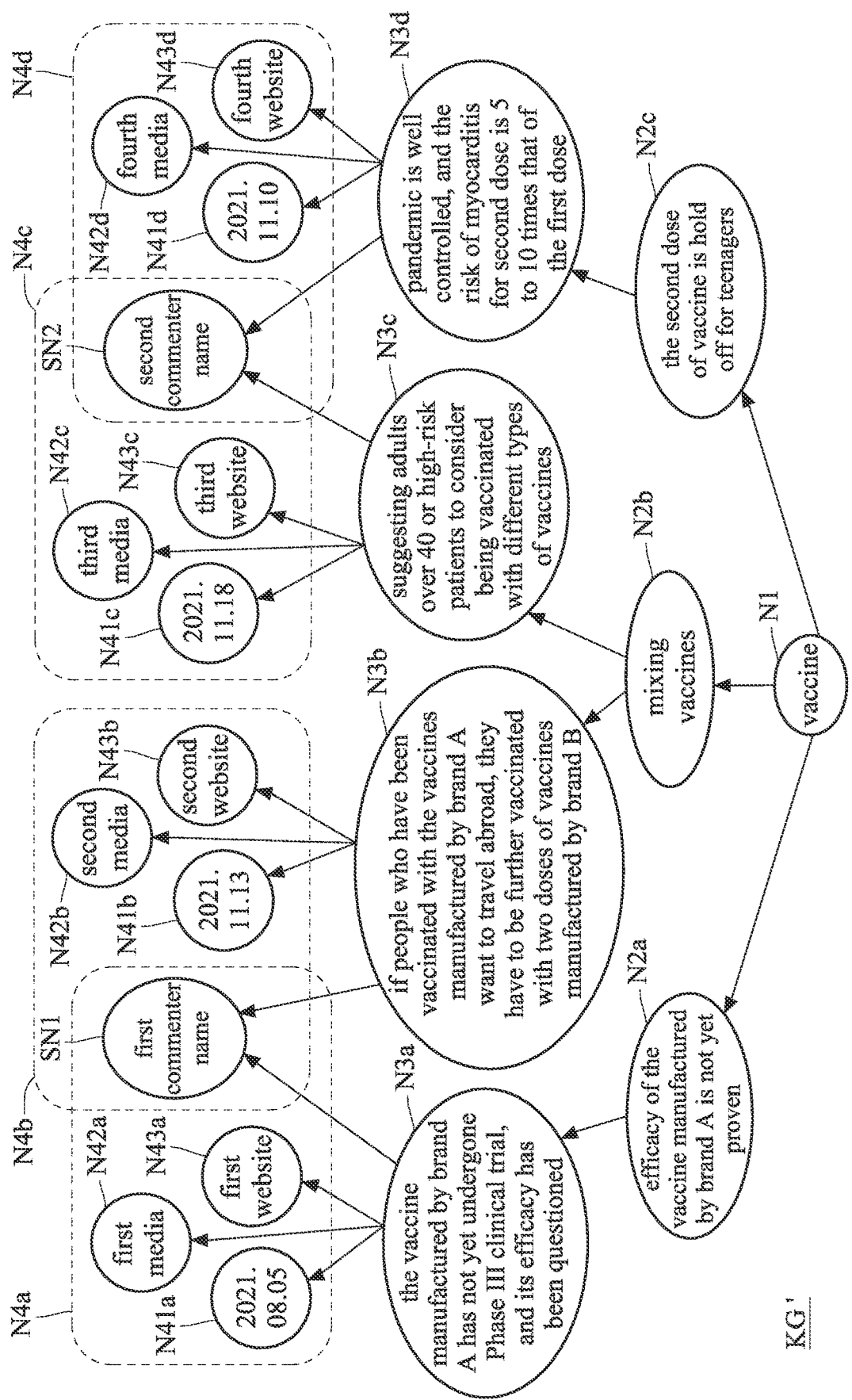
FIG. 5 is another exemplary diagram illustrating a knowledge graph according to an embodiment of the present disclosure.

In another embodiment, except for the embodiments described above, the processing device 11 may further compose the commenter identity with commenting time and a news website address. Please refer to FIG. 5, wherein FIG. 5 is another exemplary diagram illustrating a knowledge graph according to an embodiment of the present disclosure. Specifically, the event summary extracted in step S15 of FIG. 2 may include the commenter name and may further include the commenting time (i.e. time of the news article is published) and the news website address (i.e. the website address wherein the news article is published), and may further include the news media (i.e. the name of the media published the news article); or, the event summary may also include one or more of the commenter name, the commenting time, the news website address and the news media, the present disclosure is not limited thereto. Therefore, in step S17 of FIG. 2, during the processing device 11 extracting the commenter name from the event summary, the processing device 11 may further extract the commenting time, the news media and the news website address from the event summary at the same time, and compose the commenter identity with the commenter name and the corresponding commenting time, the corresponding news media and the corresponding news web site address. Take FIG. 5 as an example, the second commenter name SN2 of the fourth node N4c that the event summary of the third node N3c in the knowledge graph KG' connected to is "Luan-Yin Chang", and the event summary of the third node N3c is extracted from a news article with the news website address being the third address and the commenting time being Nov. 18, 2021, and the news article is published by a third news media. The processing device 11 uses "Luan-Yin Chang" as the commenter name SN2 of the fourth node N4c, uses date "Nov. 18, 2021" as the commenting time N41c of the fourth node N4c, uses "the third media" as the news media N42c of the fourth node N4c, and uses the third address where the news article is published as the news website address N43c of the fourth node N4c. It should be noted that, as shown in FIG. 5, the same commenter name may be connected to a number of event summaries, meaning a number of fourth nodes may indicate the same commenter name but with different commenting time, news medium and/or news website addresses. In addition, the same sub event may be connected to a number of different event summaries, and the commenter identities that the event summaries respectively connected to may be the same with each other or different from each other.

Figure 6:
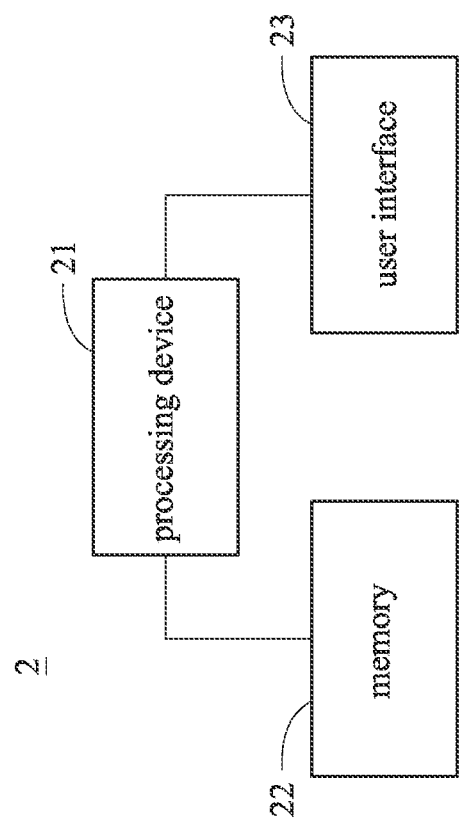
FIG. 6 is a block diagram illustrating a system of conversing news event according to an embodiment of the present disclosure.
Figure 7:
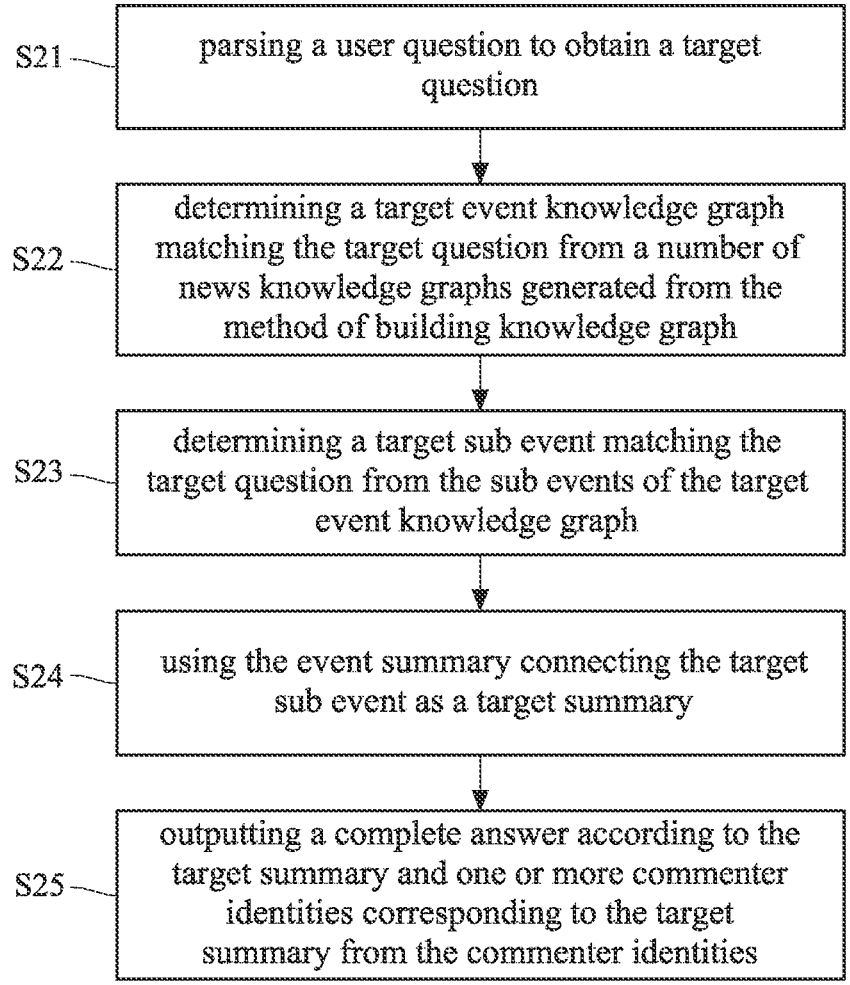
FIG. 7 is a flowchart illustrating a method of conversing news event according to an embodiment of the present disclosure.

Please refer to FIG. 6 and FIG. 7, wherein FIG. 6 is a block diagram illustrating a system of conversing news event according to an embodiment of the present disclosure, and FIG. 7 is a flowchart illustrating a method of conversing news event according to an embodiment of the present disclosure. The system of conversing news event 2 according to an embodiment of the present disclosure may include a processing device 21, a memory 22 and a user interface 23. The processing device 21 may be electrically connected to the memory 22 and the user interface 23 or in communication connection with the memory 22 and the user interface 23. The processing device 21 and the memory 22 may be the same as the processing device 11 and the memory 12 shown in FIG. 1 respectively, the processing device 21 and the memory 22 may also be different from the processing device 11 and the memory 12 shown in FIG. 1 respectively but are implemented with the same element, the present disclosure is not limited thereto. The user interface 23 is configured to receive a command (for example, the user question described below) inputted by a user and present a result (for example, the complete answer described below) corresponding to the command to the user. The user interface 23 includes, for example, a microphone, a speaker, a keyboard, a mouse and a screen, etc., and preferably includes a touch screen, but the present disclosure is not limited thereto.

The system of conversing news event 2 and method of conversing news event according to an embodiment of the present disclosure may be applied to a chatbot, to provide an answer according to the question inputted by the user. The method of conversing news event according to an embodiment of the present disclosure may be performed by the system of conversing news event 2, especially by the processing device 21 of the system of conversing news event 2. As shown in FIG. 7, the method of conversing news event according to an embodiment of the present disclosure includes: step S21: parsing a user question to obtain a target question; step S22: determining a target event knowledge graph matching the target question from a number of news event knowledge graphs generated from the method of building knowledge graph; step S23: determining a target sub event matching the target question from the sub events of the target event knowledge graph; step S24: using the event summary connecting the target sub event as a target summary; and step S25: outputting a complete answer according to the target summary and one or more commenter identities corresponding to the target summary from the commenter identities.

In step S21, the processing device 21 may receive the user question through the user interface 23, parse the user question to obtain the target question, for example, parsing the user question to obtain the target question by Natural Language Understanding (NLU). For example, if the user question is "why does the inoculation for second dose of vaccine is hold off for teenagers", the processing device 21 may obtain the target question of "inoculation for second dose of vaccine is hold off for teenagers" by NLU. Or, the processing device 21 may determine that a predetermined keyword is in the target question, and use the sentence following the predetermined keyword as the target question. For example, the predetermined keyword may include "why", "who", "when", "how" and "where" etc., and the processing device 21 may determine the user question of "why does the inoculation for second dose of vaccine is hold off for teenagers" contains the predetermined keyword of "why", and use the sentence following the predetermined keyword, which is "inoculation for second dose of vaccine is hold off for teenagers", as the target question.

In step S22, the processing device 21 determines a target event knowledge graph matching with the target question from a number of news event knowledge graphs, wherein the news event knowledge graphs are stored in the memory 22, and the news event knowledge graphs are generated from one or more embodiment of the method and system of building knowledge graph as described above. The news event knowledge graphs may correspond to different main events respectively, such as main events of "vaccine", "face mask" or "Olympics". The processing device 21 may compare the target question with each of the main events of the news event knowledge graphs, and use the matched news event knowledge graph (for example, the target question containing the main event) as the selected target event knowledge graph. Take the target question of "why does the inoculation for second dose of vaccine is hold off for teenagers" as an example, the processing device 21 determines this target question contains the main event "vaccine", and uses the news event knowledge graph of the main event "vaccine" as the target event knowledge graph, such as the knowledge graph KG shown in FIG. 4.

In steps S23 and S24, the processing device 21 compares a number of sub events in the target event knowledge graph with the target question to select the target sub event matching the target question, and uses the event summary connected to the target sub event as a target summary, wherein the processing device 21 selects the sub event matching the target question may be: determining the target question contains all the words of one of the sub events, or contains a part of words of one of the sub events with said part of words taking up to a preset percentage (for example, 50%) of all the words of the target question, but the present disclosure is not limited thereto. Take FIG. 4 as an example, the processing device 21 may determine one of the sub events of the second nodes N2a~N2c matching the target question to be used as the target sub event of the second node N2c, and use the event summary of the third node N3d connected to the target sub event of the second node N2c as the target summary.

Then, in step S25, the processing device 21 outputs the complete answer to the user interface 23 according to the target summary and the corresponding commenter identity. That is, the complete answer at least includes the commenter identity and his/her comment (that is, the target summary), wherein the processing device 21 may generate the complete answer through Natural Language Generation (NLG). Also take FIG. 4 as an example, the target summary of the third node N3d corresponds to the fourth commenter identity N4d. Therefore, the complete answer may be "name of the fourth commenter identity: The pandemic is well controlled, and the risk of myocarditis for second dose is 5 to 10 times that of the first dose". Accordingly, when the user raises a question through the user interface 23, the processing device may determine which field of expertise the question belongs to and provides the event summary for answering the user question. Therefore, the user may obtain brief and relevant information without spending much time on searching. In addition, through first determining the target event knowledge graph matching the target question from a number of the news event knowledge graphs then generating the complete answer according to the target sub event of the target event knowledge graph, the processing device may search the sub event matching the target question in a faster way without searching the matching target question from the sub events of all of the knowledge graphs, which effectively reduces time the processing device spent on generating the complete answer.

Figure 8:
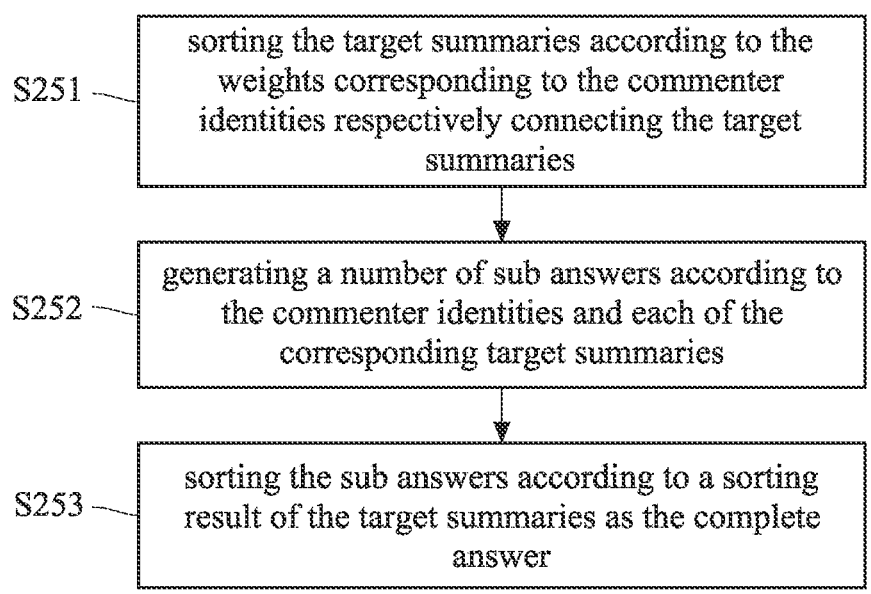
FIG. 8 is a detailed flowchart illustrating step S25 of FIG. 7.

Please then refer to FIG. 6 and FIG. 8, wherein FIG. 8 is a detailed flowchart illustrating step S25 of FIG. 7. As shown in FIG. 8, step S25 in FIG. 7 may include: step S251: sorting the target summaries according to the weights corresponding to the commenter identities respectively connecting the target summaries; step S252: generating a number of sub answers according to the commenter identities and each of the corresponding target summaries; and step S253: sorting the sub answers according to a sorting result of the target summaries as the complete answer.

As described above, the commenter identity may include the commenter name and the corresponding weight, one sub event may be connected to a number of different event summaries, and the commenter identities connected to each one of the event summaries respectively may be the same with each other or different from each other. The embodiment of FIG. 8 shows an implementation where the target summary obtained in step S24 of FIG. 7 is multiple target summaries. Therefore, in step S251, the processing device 21 sorts the target summaries according to the weights corresponding to the commenter identities that are connected to the target summaries respectively; in step S252, the processing device 21 matches the commenter identity and the corresponding target summary in a one-on-one relationship to generate a number of the sub answers; and in step S253, the processing device 21 sorts the sub answers according to the sorting result of step S251 to use the sorted sub answers as the complete answer outputted to the user interface 23.

Figure 9:
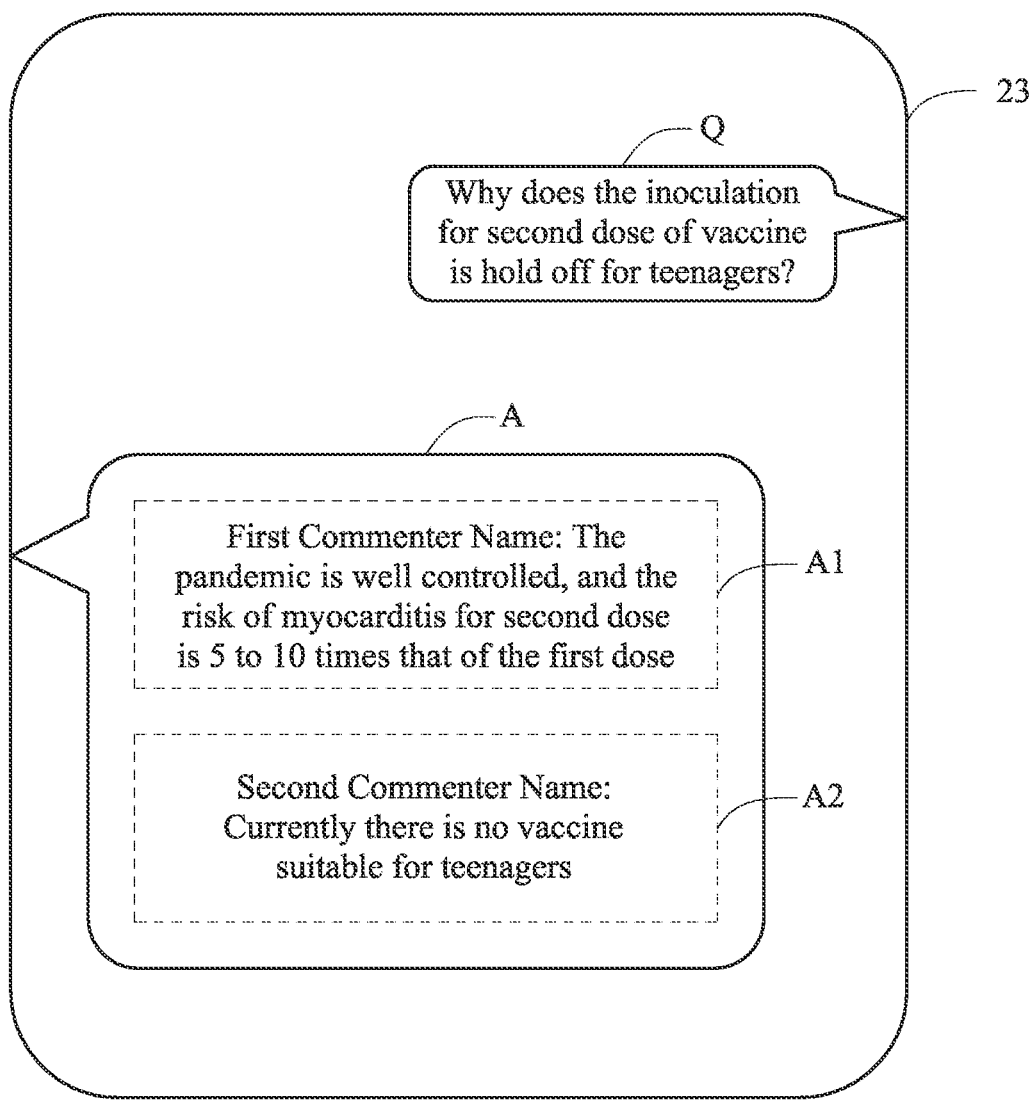
FIG. 9 is a schematic diagram illustrating applying the method and system of conversing news event according to one or more embodiment of the present disclosure to a chatbot.

To further elaborate the embodiment of FIG. 8, please refer to FIG. 6, FIG. 8 and FIG. 9, wherein FIG. 9 is a schematic diagram illustrating applying the method and system of conversing news event according to one or more embodiment of the present disclosure to a chatbot. Assuming the user question Q obtained through the user interface 23 is "why does the inoculation for second dose of vaccine is hold off for teenagers", and the target summaries matched according to the embodiment of FIG. 7 includes the first target summary "The pandemic is well controlled, and the risk of myocarditis for second dose is 5 to 10 times that of the first dose" and the second target summary "Currently there is no vaccine suitable for teenagers", the commenter identity corresponding to the first target summary includes the first commenter name and the first weight, and the commenter identity corresponding to the second target summary includes the second commenter name and the second weight, wherein the first weight and the second weight are generated according to the embodiment of FIG. 4, and the first weight is higher than the second weight. Accordingly, in step S251, the processing device 21 may sort the first target summary to be in front of the second target summary according to the first weight and the second weight; in step S252, the processing device 21 may generate the first sub answer A1 "the first commenter name: The pandemic is well controlled, and the risk of myocarditis for second dose is 5 to 10 times that of the first dose" and the second sub answer A2 "the second commenter name: Currently there is no vaccine suitable for teenagers"; and in step S253, the processing device 21 sorts the first sub answer A1 to be in front of the second sub answer A2 according to the sorting result of step S251, uses the sorted first sub answer A1 and second sub answer A2 as the complete answer A and outputs the complete answer A to the user interface 23 for the user interface 23 to present the complete answer A. Since the sub answers presented by the user interface 23 are sorted according to the weights corresponding to the commenters, and the weights indicate the level of expertise of the commenter on the subject (i.e. the main event) of his/hers comment (i.e. the event summary), the user may determine the sub answer sorted to the front is more informative and is correct comparing to the sub answer sorted to the back according to the sorted sub answers.

In view of the above, method and system of building knowledge graph according to one or more embodiment of the present disclosure may provide structural and detailed information, and the system (for example, search engine and the system of conversing news event of the present disclosure) using the knowledge graph may acquire related information according to the knowledge graph in a faster way. According to one or more embodiment of the method and system of conversing news event of the present disclosure, when a user raises a question through the user interface, the processing device may determine which the field of expertise the question belongs to may be determined and the event summary for answering the user question may be provided. Therefore, the user may obtain brief and relevant information without spending much time on searching. Further, a user may determine the sub answer sorted to front is more informative and correct comparing to the sub answer sorted to back according to the sorted sub answers. In addition, the method and system of conversing news event according to one or more embodiment of the present disclosure first determine a target event knowledge graph matching the target question from a number of the news event knowledge graphs, then generate a complete answer according to the target sub event of the target event knowledge graph, which allows the system (for example, the processing device of the embodiments of the present disclosure) to search the sub event matching the target question instead of searching for the matching target question from the sub events of all of the knowledge graphs. Therefore, time spend on generating a complete answer may be effectively reduced.

What is claimed is:

1. A method of building a knowledge graph, performed by a processing device, comprising:
classifying a plurality of news articles to a main event, with the main event associated with a plurality of sub events;
using the main event as a first node of the knowledge graph;
using the sub events as a plurality of second nodes of the knowledge graph respectively;
connecting the second nodes to the first node;
extracting a plurality of event summaries from the news articles respectively according to a template, wherein the template is "name—said/stated/pointed out—comment", wherein extracting the plurality of event summaries from the news articles respectively according to the template comprises: extracting a first word of "said", "stated" or "pointed out"; extracting a second word in front of the first word as a name in the template; extracting a sentence following the first word as a comment in the template; and combining the first word, the second word and the sentence as one of the event summaries;
using the event summaries as a plurality of third nodes of the knowledge graph respectively, and connecting each of the third nodes to one of the second nodes according to associations between the event summaries and the sub events, wherein each of the associations is one of the event summaries containing at least a part of words of one of the sub events;

extracting a plurality of commenter identities from the event summaries; and using the commenter identities as a plurality of fourth nodes of the knowledge graph, and connecting each of the fourth nodes to one of the third nodes.

2. The method of building knowledge graph according to claim 1, wherein extracting the commenter identities from the event summaries comprises:

extracting a plurality of commenter names from the event summaries;

searching for a plurality of commenter professions of the commenter names from a domain specific database based on the commenter names;

assigning a plurality of weights to the commenter names respectively according to a plurality of connections between the commenter professions and the main event, wherein the connections and the weights have a positive correlation therebetween; and composing one of the commenter identities with one of the commenter names and a corresponding weight of the weights.

3. The method of building knowledge graph according to claim 2, wherein extracting the commenter identities from the event summaries further comprises:

extracting a plurality of pieces of commenting time and a plurality of news website addresses from the event summaries; and composing one of the commenter identities with one of the commenter names, corresponding commenting time of the pieces of commenting time, and a corresponding news website address of the news website addresses.

4. A method of conversing a news event, performed by a processing device, comprising:

parsing a user question to obtain a target question;

determining a target event knowledge graph matching the target question from a plurality of news event knowledge graphs built by using the method of building knowledge graph according to claim 1;

determining a target sub event matching the target question from the sub events of the target event knowledge graph;

using the event summary connecting the target sub event as a target summary; and outputting a complete answer according to the target summary and one or more commenter identities corresponding to the target summary from the commenter identities.

5. The method of conversing news event according to claim 4, wherein the target summary is a plurality of target summaries, and outputting the complete answer according to the target summary and one or more commenter identities corresponding to the target summary from the commenter identities comprises:

sorting the target summaries according to weights corresponding to the commenter identities respectively connecting the target summaries;

generating a plurality of sub answers according to the commenter identities and each of the corresponding target summaries; and sorting the sub answers according to a sorting result of the target summaries as the complete answer.

6. A method of conversing a news event, performed by a processing device, comprising:

parsing a user question to obtain a target question;

determining a target event knowledge graph matching the target question from a plurality of news event knowledge graphs built by using the method of building knowledge graph according to claim 2;

determining a target sub event matching the target question from the sub events of the target event knowledge graph;

using the event summary connecting the target sub event as a target summary; and outputting a complete answer according to the target summary and one or more commenter identities corresponding to the target summary from the commenter identities.

7. The method of conversing news event according to claim 6, wherein the target summary is a plurality of target summaries, and outputting the complete answer according to the target summary and one or more commenter identities corresponding to the target summary from the commenter identities comprises:

sorting the target summaries according to the weights corresponding to the commenter identities respectively connecting the target summaries;

generating a plurality of sub answers according to the commenter identities and each of the corresponding target summaries; and sorting the sub answers according to a sorting result of the target summaries as the complete answer.

8. A method of conversing a news event, performed by a processing device, comprising:

parsing a user question to obtain a target question;

determining a target event knowledge graph matching the target question from a plurality of news event knowledge graphs built by using the method of building knowledge graph according to claim 3;

determining a target sub event matching the target question from the sub events of the target event knowledge graph;

using the event summary connecting the target sub event as a target summary; and outputting a complete answer according to the target summary and one or more commenter identities corresponding to the target summary from the commenter identities.

9. The method of conversing news event according to claim 8, wherein the target summary is a plurality of target summaries, and outputting the complete answer according to the target summary and one or more commenter identities corresponding to the target summary from the commenter identities comprises:

sorting the target summaries according to the weights corresponding to the commenter identities respectively connecting the target summaries;

generating a plurality of sub answers according to the commenter identities and each of the corresponding target summaries; and sorting the sub answers according to a sorting result of the target summaries as the complete answer.

10. A system of building a knowledge graph, comprising:

a memory storing a main event and a plurality of sub events, with the main event being associated with a plurality of sub events; and a processing device connected to the memory, wherein the processing device is configured to perform:

classifying a plurality of news articles to the main event;

using the main event as a first node of the knowledge graph;
using the sub events as a plurality of second nodes of the knowledge graph respectively;
connecting the second nodes to the first node;
extracting a plurality of event summaries from the news articles respectively according to a template, wherein the template is "name—said/stated/pointed out—comment", wherein extracting the plurality of event summaries from the news articles respectively according to the template comprises: extracting a first word of "said", "stated" or "pointed out"; extracting a second word in front of the first word as a name in the template; extracting a sentence following the first word as a comment in the template; and combining the first word, the second word and the sentence as one of the event summaries;
using the event summaries as a plurality of third nodes of the knowledge graph respectively, and connecting each of the third nodes to one of the second nodes according to to associations between the event summaries and the sub events, wherein each of the associations is one of the event summaries containing at least a part of words of one of the sub events;
extracting a plurality of commenter identities from the event summaries; and
using the commenter identities as a plurality of fourth nodes of the knowledge graph, and connecting each of the fourth nodes to one of the third nodes.

11. The system of building knowledge graph according to claim 10, wherein the processing device is connected to a domain specific database, and the processing device configured to perform extracting the commenter identities from the event summaries comprises:
extracting a plurality of commenter names from the event summaries;
searching for a plurality of commenter professions of the commenter names from a domain specific database based on the commenter names;
assigning a plurality of weights to the commenter names respectively according to a number of connections between the commenter professions and the main event, wherein the connections and the weights have a positive correlation therebetween; and
composing one of the commenter identities with one of the commenter names and a corresponding weight of the weights.

12. The system of building knowledge graph according to claim 11, wherein the processing device configured to perform extracting the commenter identities from the event summaries further comprises:
extracting a plurality of pieces of commenting time and a plurality of news website addresses from the event summaries; and
composing one of the commenter identities with one of the commenter names, corresponding commenting time of the pieces of commenting time, and a corresponding news website address of the news website addresses.

13. A system of conversing a news event, comprising:
a user interface configured to receive a user question;
a memory storing a plurality of news event knowledge graphs built by using the method of building knowledge graph according to claim 1; and
a processing device connected to the user interface and the memory, wherein the processing device is configured to perform:
parsing the user question to obtain a target question;
determining a target event knowledge graph matching the target question from the news event knowledge graphs;
determining a target sub event matching the target question from the sub events of the target event knowledge graph;
using the event summary connecting the target sub event as a target summary; and
outputting a complete answer according to the target summary and one or more commenter identities corresponding to the target summary from the commenter identities.

14. The system of conversing news event according to claim 13, wherein the target summary is a plurality of target summaries, and the processing device configured to perform outputting the complete answer according to the target summary and one or more commenter identities corresponding to the target summary from the commenter identities comprises:
sorting the target summaries according to weights corresponding to the commenter identities respectively connecting the target summaries;
generating a plurality of sub answers according to the commenter identities and each of the corresponding target summaries; and
sorting the sub answers according to a sorting result of the target summaries as the complete answer.

15. A system of conversing a news event, comprising:
a user interface configured to receive a user question;
a memory storing a plurality of news event knowledge graphs built by using the method of building knowledge graph according to claim 2; and
a processing device connected to the user interface and the memory, wherein the processing device is configured to perform:
parsing the user question to obtain a target question;
determining a target event knowledge graph matching the target question from the news event knowledge graphs;
determining a target sub event matching the target question from the sub events of the target event knowledge graph;
using the event summary connecting the target sub event as a target summary; and
outputting a complete answer according to the target summary and one or more commenter identities corresponding to the target summary from the commenter identities.

16. The system of conversing news event according to claim 15, wherein the target summary is a plurality of target summaries, and the processing device configured to perform outputting the complete answer according to the target summary and one or more commenter identities corresponding to the target summary from the commenter identities comprises:
sorting the target summaries according to the weights corresponding to the commenter identities respectively connecting the target summaries;
generating a plurality of sub answers according to the commenter identities and each of the corresponding target summaries; and
sorting the sub answers according to a sorting result of the target summaries as the complete answer.

17. A system of conversing a news event, comprising:
a user interface configured to receive a user question;
a memory storing a plurality of news event knowledge graphs built by using the method of building knowledge graph according to claim 3; and a processing device connected to the user interface and the memory, wherein the processing device is configured to perform:

parsing the user question to obtain a target question;

determining a target event knowledge graph matching the target question from the news event knowledge graphs;

determining a target sub event matching the target question from the sub events of the target event knowledge graph;

using the event summary connecting the target sub event as a target summary; and outputting a complete answer according to the target summary and one or more commenter identities corresponding to the target summary from the commenter identities.

18. The system of conversing news event according to claim 17, wherein the target summary is a plurality of target summaries, and the processing device configured to perform outputting the complete answer according to the target summary and one or more commenter identities corresponding to the target summary from the commenter identities comprises:

sorting the target summaries according to the weights corresponding to the commenter identities respectively connecting the target summaries;

generating a plurality of sub answers according to the commenter identities and each of the corresponding target summaries; and sorting the sub answers according to a sorting result of the target summaries as the complete answer.

* * * * *